United States Patent [19]

Contreras

[11] Patent Number: 4,463,262
[45] Date of Patent: Jul. 31, 1984

[54] THICK FILM RADIATION DETECTOR

[75] Inventor: Ben Contreras, Sedelia, Colo.

[73] Assignee: The United States of America as represented by the Secretary of the Air Force, Washington, D.C.

[21] Appl. No.: 304,123

[22] Filed: Sep. 21, 1981

[51] Int. Cl.³ .............................................. G01J 1/00
[52] U.S. Cl. .................................. 250/349; 250/352
[58] Field of Search ............... 250/352, 338, 332, 349; 338/22 R

[56] References Cited

U.S. PATENT DOCUMENTS

| | | | |
|---|---|---|---|
| 3,096,650 | 7/1963 | Lowenstein et al. | 250/338 |
| 3,355,589 | 11/1967 | Clifford | 250/338 |
| 3,619,614 | 11/1971 | Yamaka | 250/352 |
| 3,851,291 | 11/1974 | Sommer | 338/22 R |
| 3,898,605 | 8/1975 | Burns | 338/18 |
| 3,939,706 | 2/1976 | Pinson | 250/352 |
| 4,001,586 | 1/1977 | Fraioli | 250/345 |
| 4,061,917 | 12/1977 | Goranson et al. | 250/338 |
| 4,117,329 | 9/1978 | Kruer et al. | 250/338 |

OTHER PUBLICATIONS

Kerns, Jr. et al., "A Thick-Film Hybrid Laser Target Board", IEEE Trans. Components, Hybrids, & Manufacturing Tech., vol. CHMT-3, No. 3, Sep. 1980.

Primary Examiner—Alfred E. Smith
Assistant Examiner—Carolyn E. Fields
Attorney, Agent, or Firm—Donald J. Singer; Bobby D. Scearce

[57] ABSTRACT

An improved radiation detector is provided which comprises a thick film of thermistor material deposited upon a substrate of beryllium oxide, alumina or other suitable material having high thermal conductivity. The substrate is soldered to and supported by a heat sink. The detector films of this invention may be deposited in pairs, one element of each pair being shielded, to compensate for temperature fluctuations. An array of detector pairs of this invention may be constructed to measure laser beam intensity across the breadth of the beam to ascertain the intensity profile of the incident beam.

5 Claims, 4 Drawing Figures

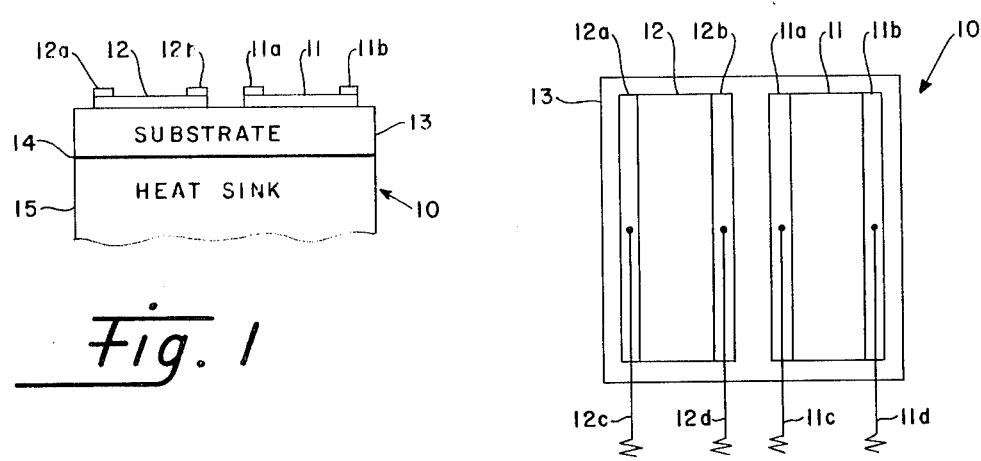
Fig. 1
Fig. 2
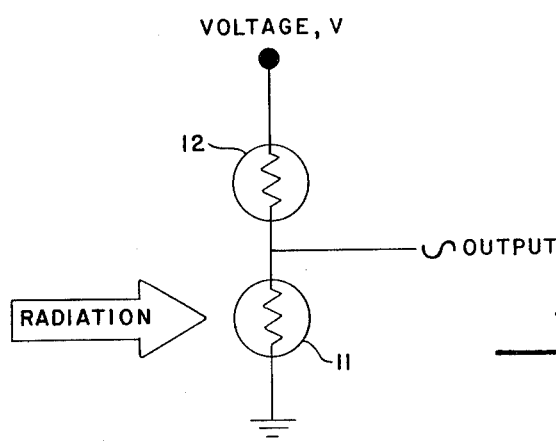
Fig. 3
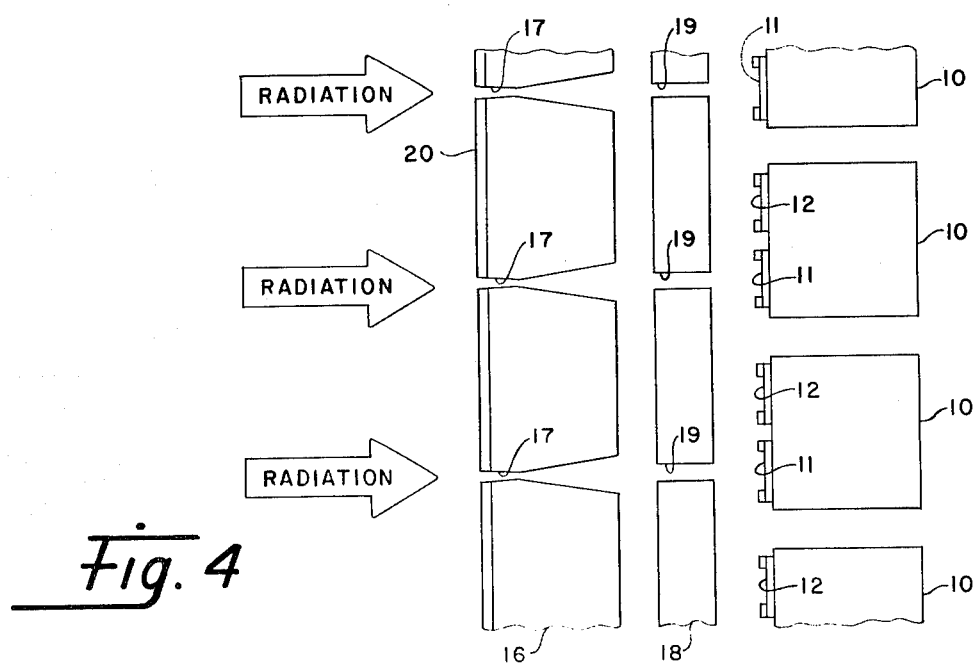
Fig. 4

THICK FILM RADIATION DETECTOR

RIGHTS OF THE GOVERNMENT

The invention described herein may be manufactured and used by or for the Government of the United States for all governmental purposes without the payment of any royalty.

BACKGROUND OF THE INVENTION

This invention relates generally to the field of radiation detector devices, and more specifically to thick film, fast response detectors of infrared radiation, which are hardened against damage by laser radiation.

Thermal detectors having fast response times finding substantial prior use have included both thermocouple and bolometer types, wherein heat sensitive elements of the detectors, through changes in resistance, provide a measure of the intensity of the radiation to which the detector is exposed. Although the sensitivity of these detectors may be low compared to other types of radiation detectors, their use for the detection of high intensity radiation from lasers is desirable. The bolometer type detector is the more desirable configuration for use in detection of high energy laser radiation because the bolometer provides voltage signals greater than those obtained from the thermocouple detector, and thus requires a lesser degree of amplification of the signals. Further, the bolometer has a better defined area of radiation detection. Therefore, the bolometer may be more accurately calibrated than the thermocouple detector.

Prior art devices for the detection of infrared radiation, and particularly laser radiation have included various thin film or thick film configurations as are disclosed by or referenced in U.S. Pat. No. 3,898,605 disclosing a bolometer in the form of a thin film of Bi or Ni evaporated onto a high thermal conductivity infrared waveguide with electrical contacts applied to each end of the thin film; U.S. Pat. No. 4,117,329 disclosing a thin film photoconductive detector comprising a thin (one micron) film of PbS on substrates of quartz, strontium titanate and silicon; U.S. Pat. No. 4,001,586 disclosing an infrared intrusion detector employing a chip or flake of cobalt oxide as the thermosensitive material; U.S. Pat. No. 4,061,917 disclosing a bolometer utilizing a thin (100–1000 A) film of bismuth on a substrate of alumina coated aluminum.

Existing detectors of infrared radiation, and particularly laser radiation, often are destroyed or have their operating characteristics altered by the very radiation they detect. Further, such devices, being thermosensitive, do not adequately provide for the effect of ambient temperature fluctuations on output, which adversely affects their reliability.

The present invention provides a novel thick film laser radiation detector having fast frequency response and a high damage threshold, and comprises a thick film of thermistor material on a substrate having high thermal conductivity. The detector is uniquely configured to provide rapid heat dissipation, and thus room temperature detection of high intensity infrared radiation, such as laser radiation, can be performed without damage to the detector. The detector may be configured in a pair of film elements to compensate for ambient temperature fluctuations. Further, a plurality of pairs may be configured into an array to determine the intensity profile of a continuous laser beam.

It is therefore an object of this invention to provide an improved radiation detector.

It is a further object of this invention to provide an improved laser radiation detector having a high damage threshold.

It is a further object of this invention to provide a laser radiation detector in which the effect of ambient temperature fluctuations is minimized.

It is a still further object of this invention to provide a laser detector system for determining the profile characteristics of an impinging laser beam.

These and other objects of the present invention will become apparent as the detailed description of certain embodiments thereof proceeds.

SUMMARY OF THE INVENTION

In accordance with the foregoing principles and objects of the present invention, an improved radiation detector is provided which comprises a thick film of thermistor material deposited upon a substrate of beryllium oxide, alumina or other suitable material having high thermal conductivity. The substrate is soldered to and supported by a heat sink. The detector films of this invention may be deposited in pairs, one element of each pair being shielded, to compensate for temperature fluctuations. An array of detector pairs of this invention may be constructed to measure laser beam intensity across the breadth of the beam to ascertain the intensity profile of the incident beam.

DESCRIPTION OF THE DRAWINGS

The present invention will be more clearly understood from the following detailed description of specific embodiments thereof read in conjunction with the accompanying drawings wherein:

FIG. 1 is a side elevational view of one embodiment of the improved detector of the present invention.

FIG. 2 is a plan view of the embodiment of the invention as depicted in FIG. 1.

FIG. 3 is a schematic representation of the detector of this invention incorporated into a typical detector circuit.

FIG. 4 is a schematic representation, in section, of an array of detectors of the present invention configured to determine the intensity profile of an incident laser beam.

DETAILED DESCRIPTION

Referring now to FIG. 1 and FIG. 2, a schematic side elevational view of one embodiment of the novel detector 10 of the present invention is shown in FIG. 1, and a plan view of the detector 10 is shown in FIG. 2. Detector 10 comprises a pair of strips of thick film deposits of thermistor material formed on a substrate of high thermal conductivity material. One strip, detector element 11, may serve as the radiation absorbing film, while the other strip, reference element 12, may serve as a shielded reference film, as is more fully described hereinafter. Detector element 11 and reference element 12 may be of any suitable radiation sensitive thick film thermistor material such as are well known in the thermistor art and commercially available, although it was found that thermistor material comprising magnesium silicate was preferred for the purposes herein described. This material is available commercially in the form of magnesium silicate based thermistor inks. The detector element 11 and reference element 12 may be deposited by any suitable method, such as by screen printing or mask printing, onto a substrate 13 of beryllium oxide, aluminum oxide, or other suitable electrically insulating material having high thermal conductivity. Film deposits having thicknesses ranging from about 10 microns to about 100 microns provided acceptable response time, signal, heat dissipation and damage resistance. Depositing detector element 11 and reference element 12 concurrently ensured substantial identity of the physical and electrical properties of the two elements.

Solderable thick film electrical contacts, 11a and 11b and 12a and 12b, of such as commercially available conductor inks, are provided at the edges of detector element 11 and reference element 12 to provide appropriate solderable electrical connections for electrical leads 11c and 11d and 12c and 12d to incorporate detector 10 into appropriate detector electronics circuitry as hereinafter described.

The surface of substrate 13 opposite films 11 and 12 may be treated in any conventional manner, such as vacuum coating with a suitable solder 14 to provide intimate thermal contact between substrate 13 and heat sink 15. The solderable contact may be such as gold, chromium, nickel, or the like, to provide the desired contact with heat sink 15. Heat sink 15 may comprise such as a copper block mounted to a steel bar, or other arrangement as might occur to one with skill in the field, for enhanced heat sink capability.

Detector 10 may be of any desired size consistent with the intensity and cross-sectional size of the beam to be measured, and may range in size from several microns to several centimeters. For the purposes hereinafter described, wherein a plurality of detectors 10 were used in a 16×16 laser target detector array, it was found convenient to provide detectors 10 as shown in FIG. 1 of the size of about one centimeter square.

Each detector 10 including a detector element 11 and reference element 12 may be connected to a voltage divider circuit as shown in FIG. 3. A known voltage V is impressed over detector element 11 and shielded reference element 12 as shown, and the output signal will provide a measure of the change in resistance of irradiated detector element 11, as compared to that of the non-irradiated reference element 12. The output signal may be conventionally amplified to a level acceptable for processing. Temperature fluctuations in the bridge circuit as shown in FIG. 3 may result in significant drift in output voltages of the circuit, which may limit the ability of circuit to detect small changes in resistance in detector element 11. Even fluctuations in ambient temperature may be detected by the circuit. The purpose of the reference bolometer, reference element 12, is to eliminate the effect of temperature drift on the detecting capability of the circuit containing the two elements. It is, therefore, highly desirable to have the two bolometers, detector element 11 and reference element 12 matched as closely as practicable.

Studies of damage mechanisms of absorbing materials subjected to intense laser radiation have shown that both total absorbed energy and peak intensity contribute to damage to the material. Excessive intensity peak can cause ablation of the material surface or perhaps fracture of materials having high thermal stress. Damage may occur even though the total power or energy deposited is small. Damage due to total energy deposited is usually caused by the melting and subsequent ablation or vaporization of the material. Further, damage to the material may be highly dependent on the cross-sectional size of the irradiating beam. Providing, as in the invention herein, a detector with enhanced radially directed cooling increased substantially the damage threshold of the detector against the effects of relatively low power, high intensity beams. Enhanced radial cooling to effect a high damage threshold characterizes the detectors of the invention herein.

The operation of the detector 10 as shown in the figures may be as follows. Radiation, such as from a laser beam, is absorbed by detector element 11 (see FIG. 3). Each of the elements 11 and 12 is of material having a high temperature coefficient of resistance, so that the resistance of detector element 11 changes upon the absorption of energy from the beam. The detector element 11 typically reaches temperature equilibrium rapidly, providing quick response time. When the radiation is removed, the temperature of detector element 11 will decrease rapidly by reason of the rapid conduction and removal of heat by substrate 13 and heat sink 15 upon which detector element 11 is deposited. Reference FIG. 1, heat sink 15 minimizes the total temperature rise of the detector 10, and thereby increases the damage threshold of detector 10. The thermal response time t of a detector 10 may be approximated by $t = l^2/K$, where l is the film thickness and K is the thermal diffusivity of the material of which the detector and reference elements are composed. In a system built for use wherein magnesium silicate was used as the material for detector element 11 and reference element 12 on a beryllium oxide substrate 13 and copper heat sink 15 of about one square centimeter, a response time t of about one millisecond was experienced. The responsivity r of the detector 10 may be approximated by $r = V\alpha l/8KA$, where V is the applied bias voltage, A is the area of detector element 11, and $\alpha$ is the temperature coefficient of resistance of the film material of detector element 11.

A plurality of detectors 10 of the invention herein as shown in the embodiment of FIGS. 1 and 2 may be used in an array to measure the intensity of an irradiating beam at discrete points across the cross-sectional profile of the beam. The values obtained from a group of detectors irradiated by the beam may then be used to approximate the intensity profile of a continuous beam. Such was the intent in the assembly of a 16×16 array of detectors 10 to form a laser radiation detector target of the invention herein. An array of pairs of detector elements 11 and reference elements 12 proved preferable over a solid array of detector elements because the analysis of the detector responses proved to be more uniform for the array of individual pairs. This modular approach had the additional advantage of allowing, when necessary, replacement of individual detector-reference pairs in the array.

As shown in FIG. 4, a faceplate 16 comprising such as a graphite plate, may be juxtaposed near an array of detectors 10 to allow sampling of an incident beam of radiation as represented by the arrows. Faceplate 16 may be provided with a plurality of holes 17 in the form of an array to match the configuration of detectors 10, such as the 16×16 array constructed as discussed above. In the array constructed, holes 17 in faceplate 16 had an area approximately 0.25 square millimeter at the irradiated surface of faceplate 16 and were spaced 0.5 inch (1.27 cm) both vertically and horizontally. Attenuation factors based on the size of the holes 17 transmitting radiation to detectors 10 were determined in order to properly qualify the detector array and associated electronics. An ordinary graphite plate was satisfactorily used as faceplate 16, was shown to resist ablation below a beam intensity of about 5 kW/cm$^2$, and demonstrated an ablation rate of less than about 0.6 mm/sec under a beam of intensity of 10 kW/cm$^2$ over an area of approximately one square centimeter.

Heat shield 18 having apertures 19 therethrough as shown in FIG. 4 may be inserted between faceplate 16 and the array of detectors 10 to prevent thermal damage to the electronics (not shown) and solder connections associated with the array. Energy absorbed by faceplate 16 may be conducted through and radiated at the back surface of faceplate 16. Laser radiation beams having intensities of several kW/cm$^2$ may cause the temperature at the back surface of faceplate 16 to reach as high as about 1000° C. in a matter of just a few seconds of irradiation time, making the use of heat shield 18 highly desirable.

Holes 19 in heat shield 18 are aligned with holes 17 in faceplate 16 to expose the detector elements 11 of detectors 10 in the array directly to the desired attenuated portion of the incident radiation as transmitted through holes 17 in faceplate 16 and holes 19 in heat shield 18. It may be desired, as in the case of the 16×16 array constructed, to provide holes 19 in heat shield 18 larger in diameter than holes 17 in faceplate 16, but smaller in area than the active area of detector elements 11 of detectors 10 in the array.

The time t for incipient heat penetration through the entire thickness of faceplate 16 may be approximated by $t = l^2/K$ where K is the heat diffusivity of the faceplate material and l its thickness. Tests conducted under a high power loading of about 10 kW/cm$^2$ resulted in a conduction time t of about two seconds for a 0.5 inch (1.27 cm) thick graphite faceplate 16. Detector elements 11 cannot distinguish between radiant heat from faceplate 16 and laser radiation directly impinging through holes 17 and 19, except as might be discriminated by reference elements 12 as discussed above. This shortcoming to the system may be overcome to a significant degree by providing a reflective surface 20 to faceplate 16 to reflect as much of the incident radiation as practical, except as is transmitted directly through holes 17.

The laser radiation target detector array of 16×16 detectors 10 which was constructed had the associated electronic circuitry located conveniently adjacent the array. Each row of 16 detectors 10 had a printed circuit board containing the detector amplifiers and multiplexer required for that row.

The detector of this invention may be incorporated into a typical differential input bridge circuit (not shown) for providing suitable signals for processing. This type of circuit was selected for use in the system constructed because, among other advantages, it proved to be insensitive to power supply fluctuations and provides that an additional bolometer can be used to compensate for background temperature fluctuations. This is most desirable due to the high sensitivity of the bolometer resistance to temperature fluctuations.

The present invention, as hereinabove described, therefore provides an improved infrared radiation detector having a high threshold to damage by laser radiation, and which may be configured in an array to measure laser beam intensity profiles. It is understood that certain modifications to the invention as hereinabove described may be made, as might occur to one with skill in the field of this invention, within the scope of the appended claims. Therefore, all embodiments contemplated hereunder have not been shown in complete detail. Other embodiments may be developed without departing from the spirit of this invention or from the scope of the appended claims.

I claim:

1. A thick film infrared radiation detector system comprising:
   a. a substrate having substantially parallel first and second surfaces and of a material which has high thermal conductivity and which is substantially electrically insulating;
   b. a plurality of substantially identical thick film strips of thermistor material deposited in pairs and configured in a retangular array on a first surface of said substrate;
   c. a heat shield covering said array and substantially coextensive therewith, for shielding one strip of each said pair in said rectangular array from incident infrared radiation, said shield having a plurality of apertures therethrough for exposing the other strip of each said pair to said radiation;
   d. a heat sink in thermal contact with said second substrate surface; and
   e. means for measuring the electrical resistances of each said strip and comparing the resistances of each pair whereby the intensity profile of the said radiation across the said array may be determined.

2. The detector system as recited in claim 1 wherein said strips of thermistor material comprise magnesium silicate.

3. The detector system as recited in claim 1 or claim 2 wherein said strips are from about 10 microns to about 100 microns in thickness.

4. The detector system as recited in claim 1 wherein said substrate comprises a material selected from the group consisting of beryllium oxide and aluminum oxide.

5. The detector system as recited in claim 1 wherein said heat sink comprises a copper block.

* * * * *